United States Patent
Weddle

(10) Patent No.: US 8,024,511 B2
(45) Date of Patent: Sep. 20, 2011

(54) SYSTEMS, DEVICES, AND/OR METHODS TO ACCESS SYNCHRONOUS RAM IN AN ASYNCHRONOUS MANNER

(75) Inventor: Robert Alan Weddle, Watauga, TN (US)

(73) Assignee: Siemens Industry, Inc., Alpharetta, GA (US)

(*) Notice: Subject to any disclaimer, the term of this patent is extended or adjusted under 35 U.S.C. 154(b) by 547 days.

(21) Appl. No.: 12/229,916

(22) Filed: Aug. 28, 2008

(65) Prior Publication Data

US 2009/0063760 A1    Mar. 5, 2009

Related U.S. Application Data

(60) Provisional application No. 60/967,205, filed on Aug. 31, 2007.

(51) Int. Cl.
*G06F 12/00* (2006.01)
(52) U.S. Cl. .................. 711/104; 711/163; 711/154
(58) Field of Classification Search .................. 711/101, 711/104, 163; 365/233
See application file for complete search history.

(56) References Cited

U.S. PATENT DOCUMENTS

| | | | | |
|---|---|---|---|---|
| 5,901,304 | A * | 5/1999 | Hwang et al. | 711/105 |
| 6,075,830 | A * | 6/2000 | Piirainen | 375/354 |
| 6,536,029 | B1 | 3/2003 | Boggs | |
| 6,658,544 | B2 * | 12/2003 | Gray | 711/167 |
| 6,763,443 | B1 * | 7/2004 | Clark et al. | 711/167 |
| 2004/0123033 | A1 * | 6/2004 | Rudelic | 711/118 |
| 2005/0166135 | A1 | 7/2005 | Burke | |
| 2006/0018185 | A1 | 1/2006 | Kurotsuchi | |
| 2007/0174575 | A1 | 7/2007 | Lovett | |
| 2008/0127065 | A1 | 5/2008 | Bryant | |

FOREIGN PATENT DOCUMENTS

EP    1182575    2/2002

* cited by examiner

*Primary Examiner* — John Lane

(57) ABSTRACT

Certain exemplary embodiments can provide a method, which can comprise, via a state machine implemented as an application specific integrated circuit, responsive to an automatically detected asynchronous RAM interface signal, automatically transmitting a corresponding synchronous RAM interface signal. The state machine can be communicatively coupled to a programmable logic controller.

21 Claims, 7 Drawing Sheets

3100

7000

SYSTEMS, DEVICES, AND/OR METHODS TO ACCESS SYNCHRONOUS RAM IN AN ASYNCHRONOUS MANNER

CROSS-REFERENCE TO RELATED APPLICATIONS

This application claims priority to, and incorporates by reference herein in its entirety, pending U.S. Provisional Patent Application Ser. No. 60/995,350, filed 26 Sep. 2007 and pending U.S. Provisional Patent Application Ser. No. 60/967,205, filed 31 Aug. 2007.

BACKGROUND

United States Patent 20080127065 (Bryant), which is incorporated by reference herein in its entirety, discloses that "[c]ertain exemplary embodiments comprise a system. The system can comprise a user interface renderer, which can be adapted to render a plurality of distinct user interfaces. Each user interface from the plurality of distinct user interfaces can be adapted to configure a corresponding software application from a plurality of software applications associated with operating a programmable logic controller (PLC)." See Abstract.

United States Patent 20050166135 (Burke), which is incorporated by reference herein in its entirety, discloses that "[a]n apparatus, system and method for synchronizing the playback of data transmitted over an asynchronous network. An initialization module may initialize at least two receivers to receive playback data from a transmission module. The transmission module may then transmit to the receivers the playback data, and, in some embodiments, synchronization data. Synchronization data may include a playback indicator by which the receivers may determine an appropriate playback data consumption rate. A buffer module may buffer a predetermined amount of playback data which may be played in response to a start signal individually addressed to the receivers." See Abstract.

SUMMARY

Certain exemplary embodiments can provide a method, which can comprise, via a state machine implemented as an application specific integrated circuit, responsive to an automatically detected asynchronous RAM interface signal, automatically transmitting a corresponding synchronous RAM interface signal. The state machine can be communicatively coupled to a programmable logic controller.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method, which can comprise, via a state machine implemented as an application specific integrated circuit, responsive to an automatically detected asynchronous random access memory ("RAM") interface signal, automatically transmitting a corresponding synchronous RAM interface signal. The state machine can be communicatively coupled to a programmable logic controller.

Figure 1:
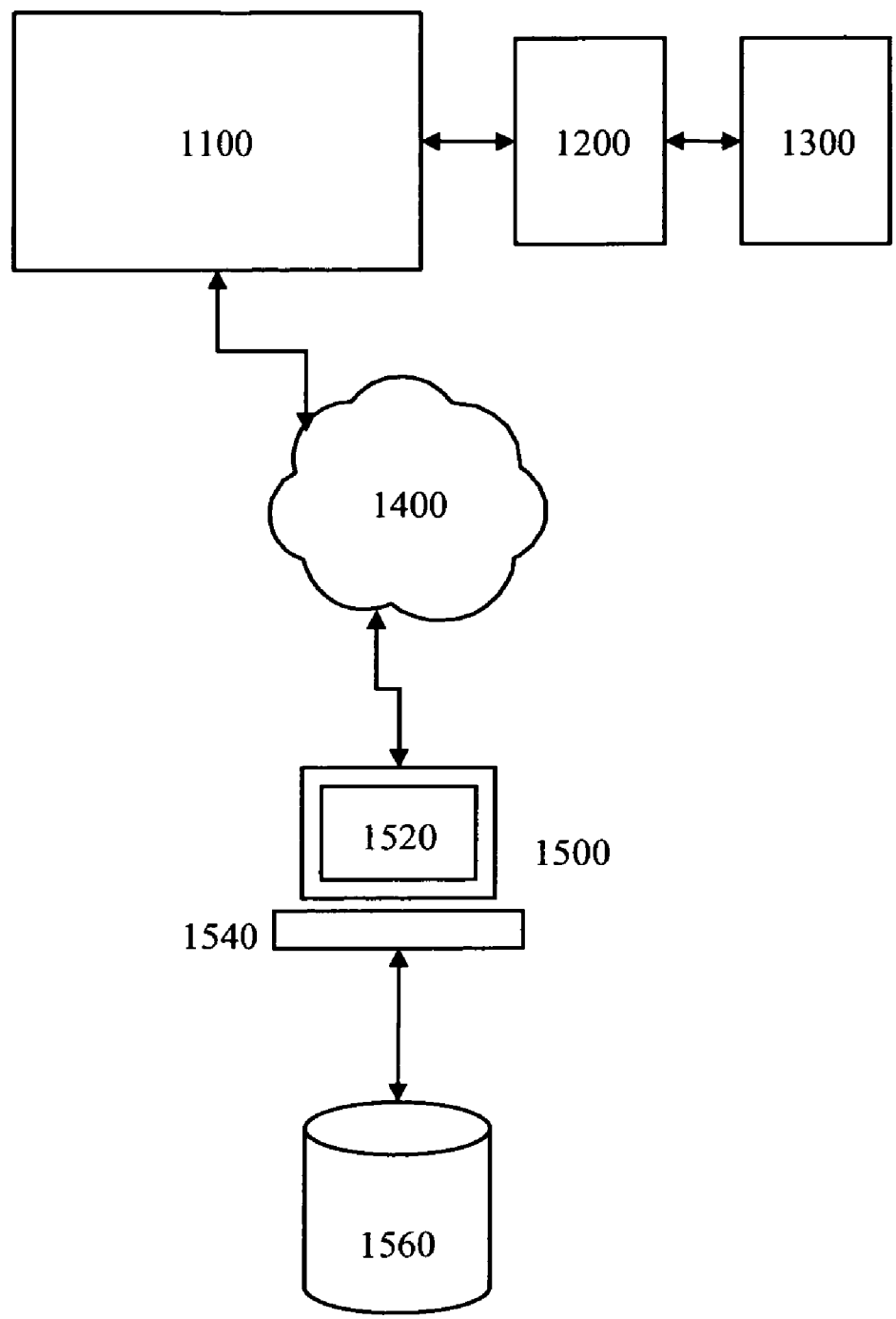
FIG. 1 is a block diagram of an exemplary embodiment of a system 1000.

FIG. 1 is a block diagram of an exemplary embodiment of a system 1000, which can comprise a programmable logic controller 1100. In certain exemplary embodiments, programmable logic controller 1100 can comprise and/or be communicatively coupled to a state machine 1200 and a synchronous RAM 1300. Programmable logic controller 1100 can be communicatively coupled to an information device 1500 via a network 1400. Information device 1500 can comprise and/or be communicatively coupled to a user interface 1520, a user program 1540, and a memory 1560. User program 1540 can be adapted to monitor and/or control one or more activities associated with programmable logic controller 1100 such as transfers between programmable logic controller 1100 and synchronous RAM 1300 via state machine 1200. User interface 1520 can be adapted to render information regarding programmable logic controller 1100 such as transfers between programmable logic controller 1100 and synchronous RAM 1300 via state machine 1200. Memory 1560 can be adapted to store and/or retrieve information regarding programmable logic controller 1100.

State machine 1200 can be implemented as an application specific integrated circuit. State machine 1200 can be adapted to, responsive to an automatically detected asynchronous RAM interface signal, automatically transmit a corresponding synchronous RAM interface signal.

Figure 2:
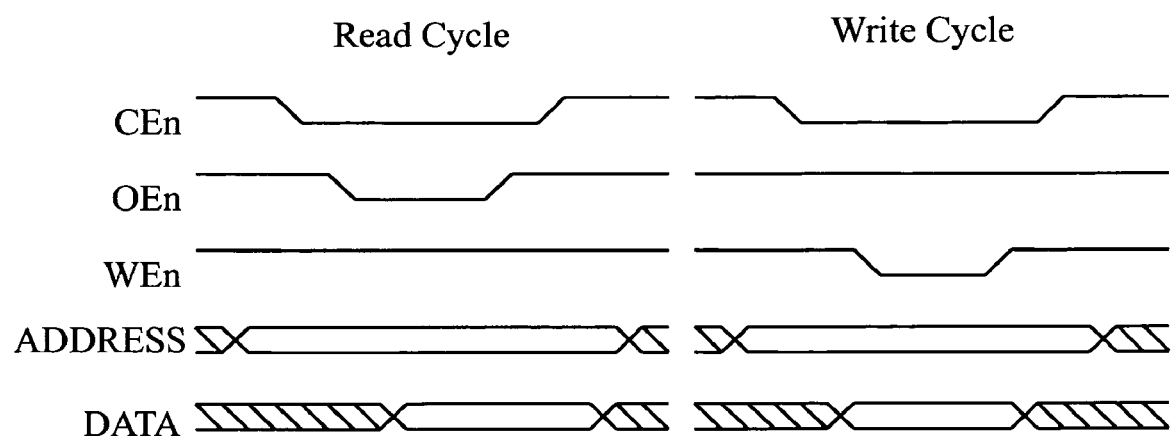
FIG. 2 is an asynchronous interface timing of original technology.

FIG. 2 is an asynchronous interface timing of original technology. During a redesign effort of an existing application specific integrated circuit (ASIC) for a programmable logic controller (PLC), an obsolete external asynchronous RAM was required to be pulled internal to the ASIC/FPGA (field programmable gate array). The RAM blocks internal to the FPGA were all synchronous RAM blocks. An extensive redesign effort was to be required to use the synchronous RAM blocks, until an asynchronous-to-synchronous waveform converter state machine was developed.

ASIC/FPGA development tools can integrate RAM blocks internal to the chips. These RAM blocks can be accessed by synchronous waveforms specific to the target chip. When integrating external asynchronous RAM in the target chips, an extensive redesign of the logic or existing state machine can be required to utilize the internal RAM blocks.

A state machine can be developed to create synchronous waveforms based on the typical asynchronous waveforms previously used in the application.

When developers are integrating existing asynchronous RAM designs into ASICs or FPGAs, extensive redesigns to the RAM interface logic can be performed since internal RAM blocks are synchronous in nature. By developing a simple interface state machine between the original logic and the synchronous RAM blocks, one can emulate an asynchronous RAM using the synchronous RAM blocks.

A state machine can be developed to react to the typical asynchronous RAM interface signals (e.g., read, write, address, data in, data out, chip select, and/or output enable, etc.) and create corresponding synchronous RAM interface signals (e.g., clock, read, write, read address, write address, read data, and/or write data, etc.). Each state machine can be developed based in the process creating the asynchronous waveforms (e.g., microprocessor, microcontroller, other state machine, and/or timing for synchronous RAM, etc.).

Each step of the state machine can be controlled by a master system clock. One application can use a synchronous RAM from an Altera Cyclone FPGA and an 80C51 microcontroller.

Figure 3:
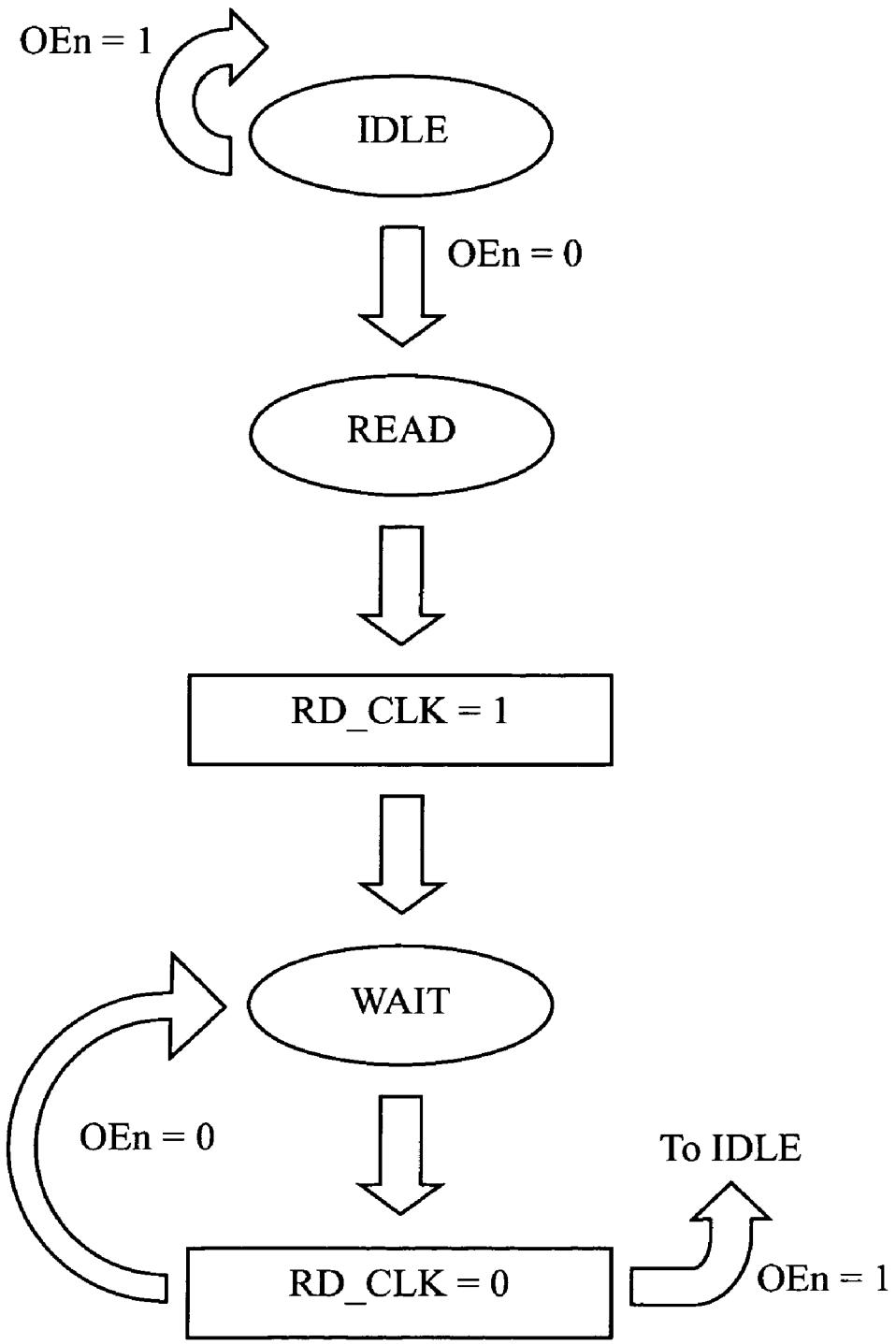
FIG. 3 is an emulated asynchronous read cycle state machine.

FIG. 3 is an emulated asynchronous read cycle state machine. For this case, the read cycle only requires 3 states, IDLE, READ, and WAIT. The IDLE state waits on the asynchronous event output enable, OEn, to occur. When this signal is detected, the state machine will go to the READ state on the next system clock cycle. In this state, the read clock, RD CLK, toggles to a high state to latch the address into internal registers for the synchronous RAM. The RAM then will output the data at the latched address on the DATA bus. On the next system clock cycle, the state machine goes to the WAIT state. This state will toggle the RD CLK low. The state machine will then transition to IDLE again only after the OEn signal is removed.

Figure 4:
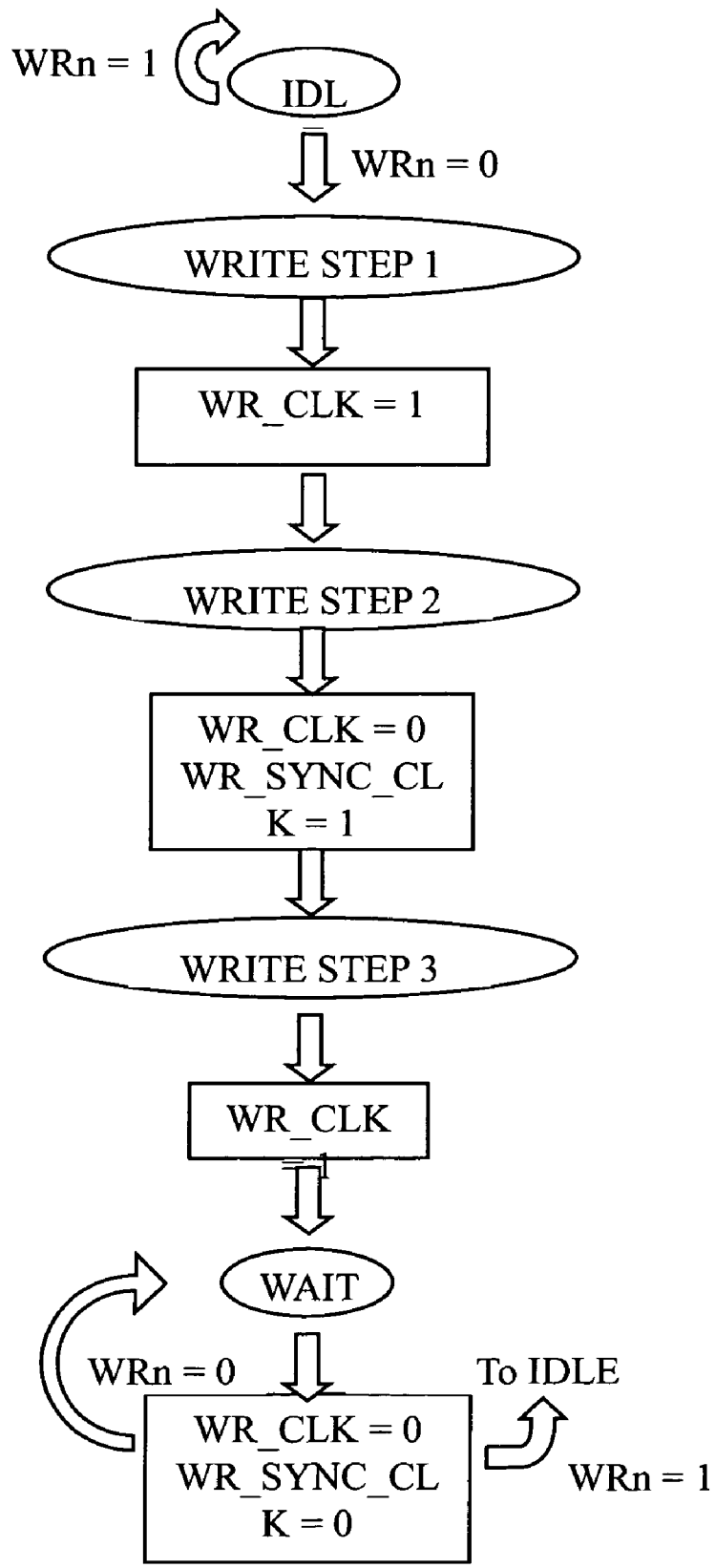
FIG. 4 is an emulated asynchronous write cycle state machine.

FIG. 4 is an emulated asynchronous write cycle state machine. The write cycle can use five states, IDLE, WRITE STEP 1, WRITE STEP 2, WRITE STEP 3 and WAIT. (The multiple write steps are required since the application uses an 8 bit microcontroller to access 16 bit data.) The IDLE state can wait on the asynchronous event write enable, WRn, to occur. When this signal is detected, the state machine can go the WRITE STEP 1 state on the next system clock cycle. In this state, the write clock, WR CLK, can toggle to a high state to latch the first byte of data into a holding register. On the next system clock cycle, the state machine can go to the WRITE STEP 2 state where the WR CLK signal can be toggled to a low state and a write sync clock signal, WR SYNC CLK can be toggled high. The WR SYNC CLK can be used to latch the address and enable the write for the synchronous RAM. On the next system clock cycle, the WR CLK signal can be toggled high to latch the next byte of data. Since the write of the synchronous RAM has been enabled, the address can be latched and the data can be stored at the proper location. On the next system clock cycle, the state machine can go to the WAIT state where the WR CLK and WR SYNC CLK are returned to their inactive state. The state machine can remain in the WAIT state until the asynchronous WRn signal is removed. At this point the state machine can return to the IDLE state on the next system clock cycle.

Figure 5:
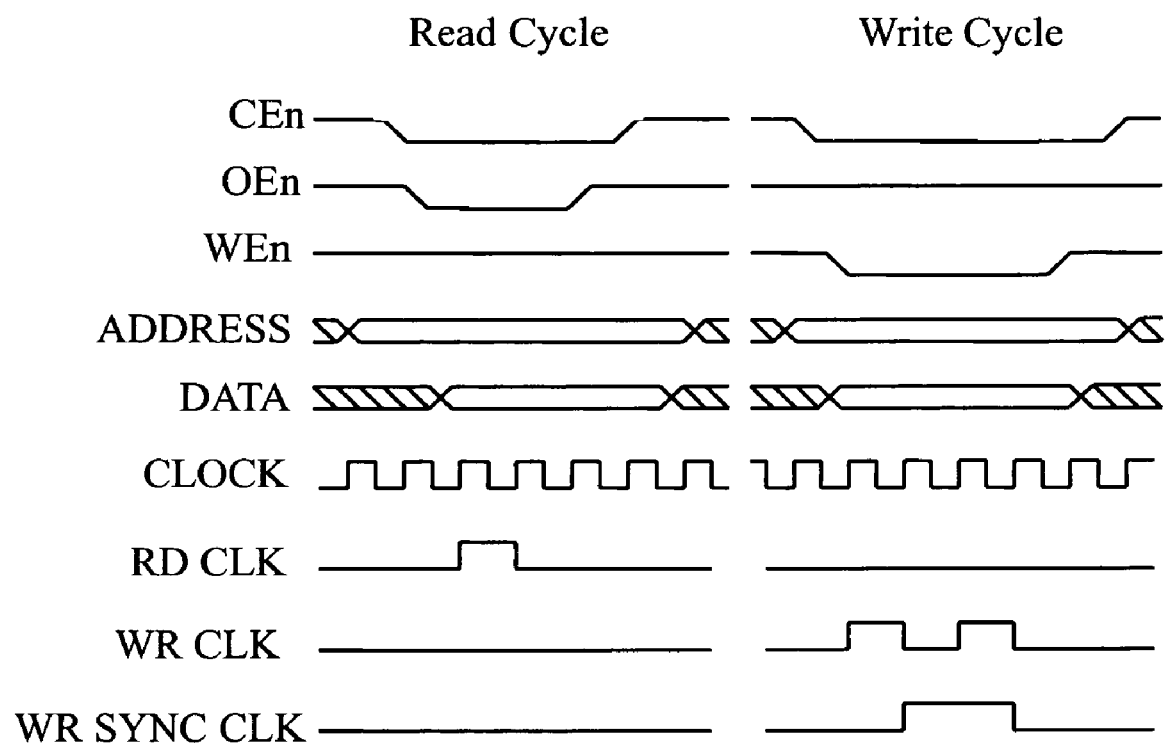
FIG. 5 is an emulated asynchronous interface timing diagram.

FIG. 5 is an emulated asynchronous interface timing diagram. The timing diagram can be indicative of a read cycle in accordance with to the state machine of FIG. 3 and a write cycle in accordance with the state machine of FIG. 4. Via the clock signal, each state machine can receive asynchronous signals and can convert the asynchronous signals to corresponding synchronous signals that can be communicated to a synchronous RAM.

Figure 6:
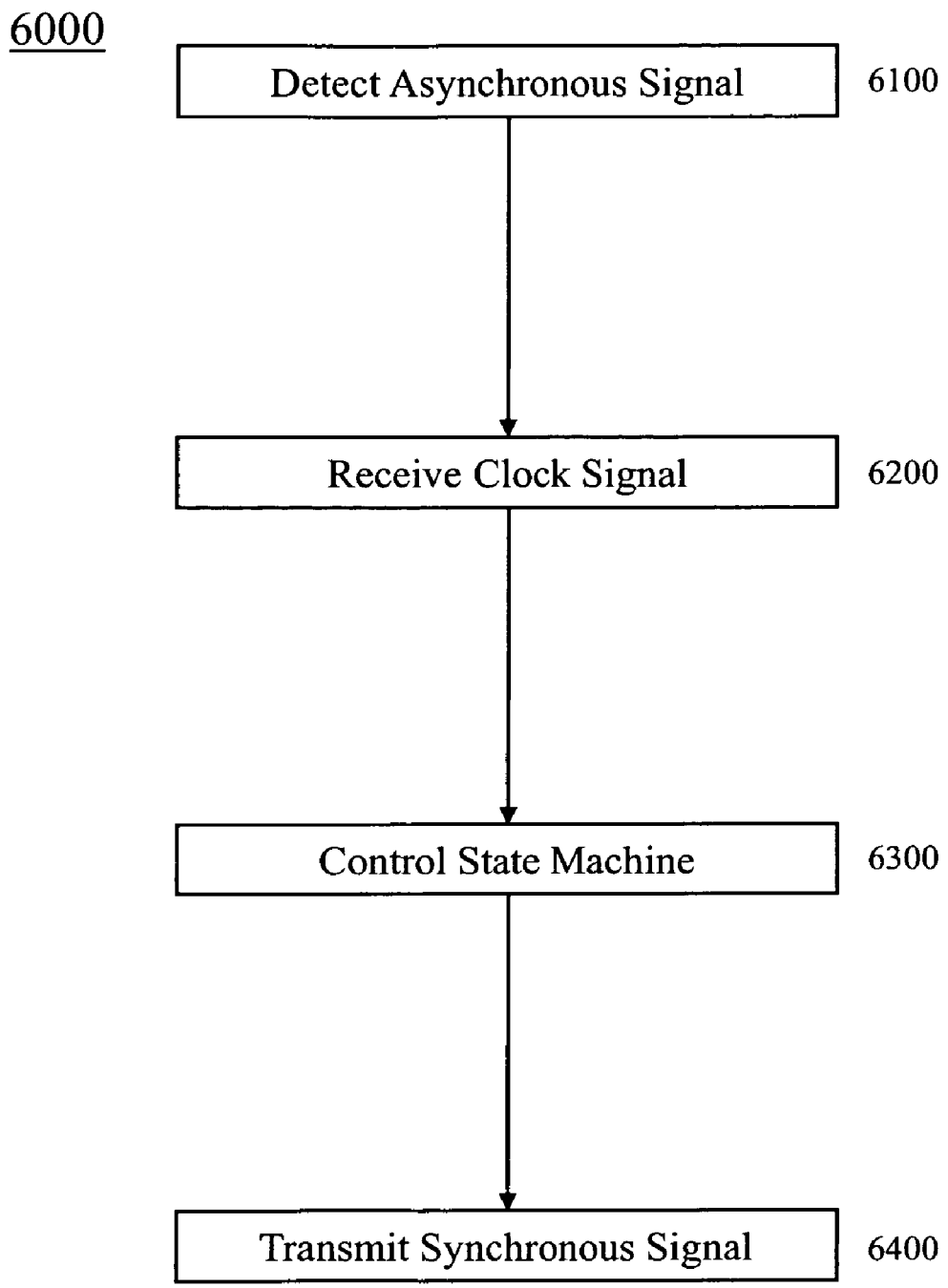
FIG. 6 is a flowchart of an exemplary embodiment of a method 6000.

FIG. 6 is a flowchart of an exemplary embodiment of a method 6000. Each activity or subset of activities of method 6000 can be performed automatically. Each activity or subset of activities of method 6000 can be stored as machine-implementable instructions on a machine-readable medium. Stored machine instructions can be executed via a state machine and/or an information device to perform one or more functions of method 6000.

At activity 6100, an asynchronous signal can be received and/or detected such as by a state machine. The asynchronous signal can be an asynchronous RAM interface signal. The asynchronous signal can request a performance of one or more activities by a synchronous RAM. The state machine can be comprised by, and/or communicatively coupled to, a programmable logic controller. The state machine can be implemented as an application specific integrated circuit.

At activity 6200, a clock signal can be received, such as from a master system clock. The clock signal can be adapted for use in converting the asynchronous signal to a corresponding synchronous signal, which can be a synchronous RAM interface signal.

At activity 6300, the state machine can be controlled. For example, the state machine can cause data to be written to and/or read from the synchronous RAM. In certain exemplary embodiments, the state machine can be controlled via the state machine and/or the master system clock. For example, at the state machine, upon occurrence of an asynchronous event output enable, a read cycle can be entered. The read cycle can be adapted to obtain information from the synchronous RAM. In certain exemplary embodiments, at the state machine, upon entering a read cycle, the state machine can be toggled to a high state. In certain exemplary embodiments, at the state machine, upon entering the read cycle, a read address can be latched into internal registers for the synchronous RAM. At the state machine, upon occurrence of an asynchronous event write enable, a write cycle can be initiated and/or entered. At the state machine, upon entering a write cycle:

a write clock can be toggled to a high state;
at least a portion of data can be latched into a holding register;
a write address can be latched; and/or
a write operation into the synchronous RAM can be enabled;
data can be written at the latched address; etc.

In certain exemplary embodiments, upon writing data to the synchronous RAM, the state machine can be toggled to a low state and/or transitions to an IDLE state.

At activity 6400, the corresponding synchronous signal can be transmitted to the synchronous RAM. The synchronous RAM can be adapted to receive the synchronous signal. The synchronous signal can be adapted to cause data to be read from and/or written to the synchronous RAM. In certain exemplary embodiments, the synchronous RAM can output data at a latched address. Upon outputting data from the synchronous RAM, the state machine and/or the synchronous RAM can enter a WAIT state. Upon outputting data from the synchronous RAM, the state machine and/or the synchronous RAM can toggle to a low state. Upon outputting data from the synchronous RAM, the state machine and/or the synchronous RAM can transitioned to an IDLE state.

Figure 7:
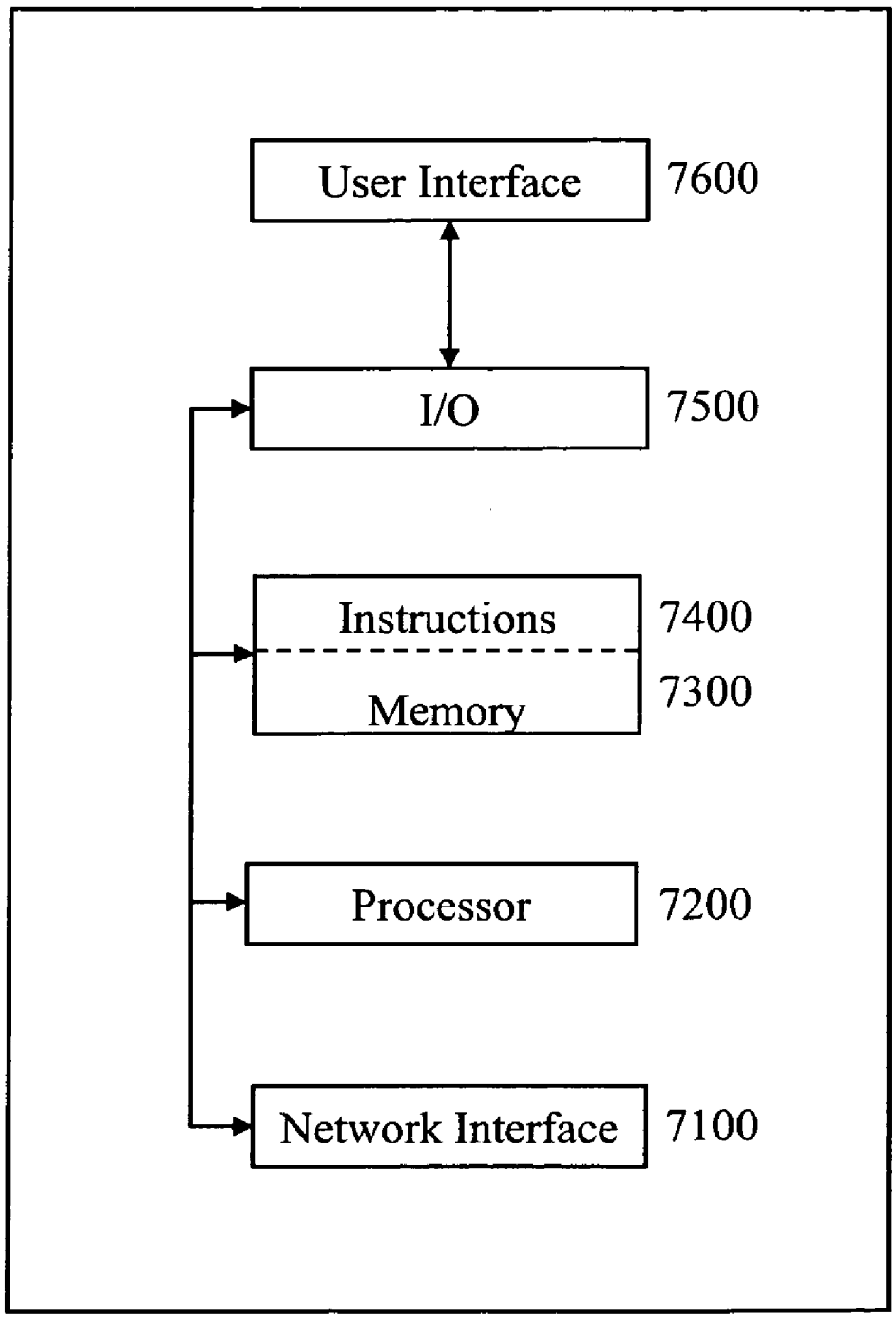
FIG. 7 is a block diagram of an exemplary embodiment of an information device 7000.

FIG. 7 is a block diagram of an exemplary embodiment of an information device 7000, which in certain operative embodiments can comprise, for example, information device 1500, of FIG. 1. Information device 7000 can comprise any of numerous circuits and/or components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 7600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, deed, function, step, and/or process and/or a portion thereof.

adapted to—suitable, fit, and/or capable of performing a specified function.

address—(n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network.

apparatus—an appliance and/or device for a particular purpose.

application specific integrated circuit—a miniaturized electronic circuit that has been manufactured in the surface of a thin substrate of semiconductor material that is customized for a particular use.

associate—to relate, bring together in a relationship, map, combine, join, and/or connect.

asynchronous—adapted to operate in a manner that is not governed by a clock circuit or global clock signal, but instead is based upon signals that indicate completion of instructions and/or operations.

at least—not less than.

automatically—acting and/or operating in a manner essentially independent of external human influence and/or control. For example, an automatic light switch can turn on upon "seeing" a person in its view, without the person manually operating the light switch.

can—is capable of, in at least some embodiments.

cause—to bring about, provoke, precipitate, produce, elicit, be the reason for, result in, and/or effect.

circuit—an electrically conductive pathway and/or a communications connection established across two or more switching devices comprised by a network and between corresponding end systems connected to, but not comprised by the network.

communicatively—linking in a manner that facilitates communications.

comprising—including but not limited to, what follows.

configure—to design, arrange, set up, shape, and/or make suitable and/or fit for a specific purpose.

connect—physically or logically join, link, couple, and/or fasten two or more entities.

controlling—directing.

convert—to transform, adapt, and/or change, such as from a first form to a second form.

corresponding—related, associated, accompanying, similar in purpose and/or position, conforming in every respect, and/or equivalent and/or agreeing in amount, quantity, magnitude, quality, and/or degree.

couple(d)—to join, connect, and/or link two things together.

create—to make, form, produce, generate, bring into being, and/or cause to exist.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

detect—to sense, perceive, identify, discover, ascertain, respond to, and/or receive the existence, presence, and/or fact of.

determine—to obtain, calculate, decide, deduce, establish, and/or ascertain.

device—a machine, manufacture, and/or collection thereof.

enable—to render capable for a task.

enter—to come and/or flow into.

estimate—to calculate and/or determine approximately and/or tentatively.

event—an occurrence.

from—used to indicate a source.

further—in addition.

generate—to create, produce, render, give rise to, and/or bring into existence.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

high state—a logical signal level that is interpretable as being greater than a low state.

holding register—a memory adapted to store data.

IDLE state—a condition in which a circuit is not performing any function.

implement—the act of accomplishing some aim or executing some order.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initialize—to create, produce, render, give rise to, and/or bring into existence.

input—a signal, data, and/or information provided to a processor, device, and/or system.

install—to connect and/or place in position and prepare for use.

instructions—directions adapted to perform a particular operation or function.

interface—(n) a boundary across which two independent systems meet and act on and/or communicate with each other. (v) to connect with and/or interact with by way of an interface.

internal registers—memory circuits that are intrinsic to a device and/or system.

into—to a condition, state, or form of.

latching—to set a circuit in a particular configuration.

low state—a logical signal level that is interpretable as being less than a high state.

machine—a device and/or vehicle adapted to perform at least one task.

machine-readable medium—one or more physical structures from which a machine can obtain data and/or information. Examples include one or more memories, memory devices, punch cards, bar codes, etc.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

master—a machine or component adaptable to control another machine or component.

may—is allowed and/or permitted to, in at least some embodiments.

memory—the memory of the information device can be any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

occurrence—an event that takes place.

operation—a series of actions in performing a function.

output—(n) something produced and/or generated; data produced by an information device executing machine-readable instructions; and/or the energy, power, work, signal, and/or information produced by a system. (v) to provide, produce, manufacture, and/or generate.

plurality—the state of being plural and/or more than one.

portion—a part, component, section, percentage, ratio, and/or quantity that is less than a larger whole. Can be visually, physically, and/or virtually distinguishable and/or non-distinguishable.

predetermined—determine, decide, or establish in advance.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, ignitors, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

provide—to furnish, supply, give, convey, send, and/or make available.

random access memory (RAM)—integrated circuits that allow stored data to be accessed in any order.

read—obtain from a memory device.

read cycle—a predetermined sequence of events adapted to obtain data from a memory device.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

repeatedly—again and again; repetitively.

request—(v.) to express a need and/or desire for; to inquire and/or ask for. (n.) that which communicates an expression of desire and/or that which is asked for.

responsive—reacting to an influence and/or impetus.

said—when used in a system or device claim, an article indicating a subsequent claim term that has been previously introduced.

select—to make and/or indicate a choice and/or selection from among alternatives.

set—a related plurality of predetermined elements; and/or one or more distinct items and/or entities having a specific common property or properties.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

soft deadline—the general case where completing the activity by the deadline results in the system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with the anti-lock braking system where a slow down in response would likely cause system failure, possibly even catastrophic failure.

state machine—mainframe, minicomputer, workstation, computer terminal, personal computer, laptop, PDA, mobile terminal, cellular telephone, Bluetooth device, communicator, telephonic device, pager, facsimile, etc.

store—to place, hold, retain, enter, and/or copy into and/or onto a machine-readable medium.

structure—that which is complexly constructed, such as a building and/or an addition to a building; a hierarchy and/or placement of objects in a document; and/or a manner in which components are organized and/or form a whole.

substantially—to a considerable, large, and/or great, but not necessarily whole and/or entire, extent and/or degree.

synchronous—a digital circuit in which components are synchronized by a clock signal.

system—a collection of mechanisms, devices, machines, articles of manufacture, processes, data, and/or instructions, the collection designed to perform one or more specific functions.

system clock—a device and/or system adapted to provide a synchronizing temporal signal to one or more circuits.

toggle—to switch from a first state to a second state.

transition—to change from a first state to a second state.

transmit—to provide, furnish, supply, send as a signal, and/or to convey (e.g., force, energy, and/or information) from one place and/or thing to another.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

WAIT state—a condition in which a circuit is idle pending receipt of a predetermined signal.

write—to place data in a memory device.

write cycle—a predetermined sequence of events adapted to store data in a memory device.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
   a state machine implemented as an application specific integrated circuit, said state machine adapted to, responsive to an automatically detected asynchronous RAM interface signal, automatically transmit a corresponding synchronous RAM interface signal, said state machine communicatively coupled to a programmable logic controller; and
   wherein the state machine is adapted to enter a read cycle upon occurrence of an asynchronous event output enable.

2. The system of claim 1, further comprising:
   said programmable logic controller.

3. The system of claim 1, further comprising:
   a synchronous RAM adapted to receive said synchronous RAM interface signal.

4. The system of claim 1, wherein said state machine is adapted to:
   automatically detect said asynchronous RAM interface signal.

5. The system of claim 1, wherein said state machine is adapted to:
   control a synchronous RAM via a master system clock.

6. The system of claim 1, wherein said state machine is adapted to:
   upon entering a read cycle, toggle to a high state.

7. The system of claim 1, wherein said state machine is adapted to:
   upon entering a read cycle, latch a read address into internal registers for a synchronous RAM adapted to receive said synchronous RAM interface signal.

8. The system of claim 1, wherein said state machine is adapted to:
   output data at a latched address.

9. The system of claim 1, wherein said state machine is adapted to:
   upon outputting data from a synchronous RAM adapted to receive said synchronous RAM interface signal, enter a WAIT state.

10. The system of claim 1, wherein said state machine is adapted to:
    upon outputting data from a synchronous RAM adapted to receive said synchronous RAM interface signal, toggle to a low state.

11. The system of claim 1, wherein said state machine is adapted to:
    upon outputting data from a synchronous RAM adapted to receive said synchronous RAM interface signal, transition to an IDLE state.

12. The system of claim 1, wherein said state machine is adapted to:
    upon occurrence of an asynchronous event write enable, enter a write cycle.

13. The system of claim 1, wherein said state machine is adapted to:
    upon entering a write cycle, toggle a write clock to a high state.

14. The system of claim 1, wherein said state machine is adapted to:
    upon entering a write cycle, latch at least a portion of data into a holding register.

15. The system of claim 1, wherein said state machine is adapted to:
    upon entering a write cycle:
      latch at least a portion of data into a holding register;
      latch a write address; and
      enable a write operation into said synchronous RAM.

16. The system of claim 1, wherein said state machine is adapted to:

to a synchronous RAM adapted to receive said synchronous RAM interface signal, write data at a latched address.

17. The system of claim 1, wherein said state machine is adapted to:
upon writing data to a synchronous RAM adapted to receive said synchronous RAM interface signal, enter a WAIT state.

18. The system of claim 1, wherein said state machine is adapted to:
upon writing data to a synchronous RAM adapted to receive said synchronous RAM interface signal, toggle to a low state.

19. The system of claim 1, wherein said state machine is adapted to:
upon writing data to a synchronous RAM adapted to receive said synchronous RAM interface signal, transition said state machine to an IDLE state.

20. A method comprising:
via a state machine implemented as an application specific integrated circuit, responsive to an automatically detected asynchronous RAM interface signal, automatically transmitting a corresponding synchronous RAM interface signal, said state machine communicatively coupled to a programmable logic controller; and
entering a read cycle upon occurrence of an asynchronous event output enable.

21. A machine-readable storage medium comprising machine-implementable instructions for activities comprising:
via a state machine implemented as an application specific integrated circuit, responsive to an automatically detected asynchronous RAM interface signal, automatically transmitting a corresponding synchronous RAM interface signal, said state machine communicatively coupled to a programmable logic controller; and
entering a read cycle upon occurrence of an asynchronous event output enable.

* * * * *